No. 810,097. PATENTED JAN. 16, 1906.
A. K. WALLEN, Sr.
WELL BORING APPARATUS.
APPLICATION FILED MAY 5, 1903.
2 SHEETS—SHEET 2.
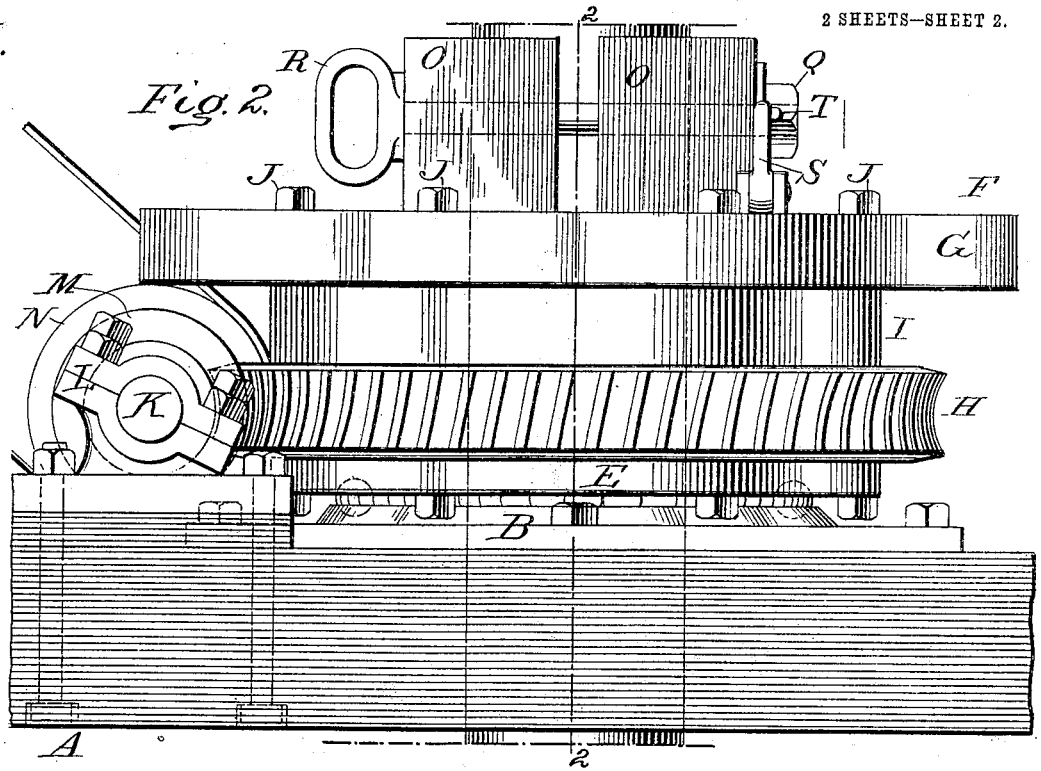
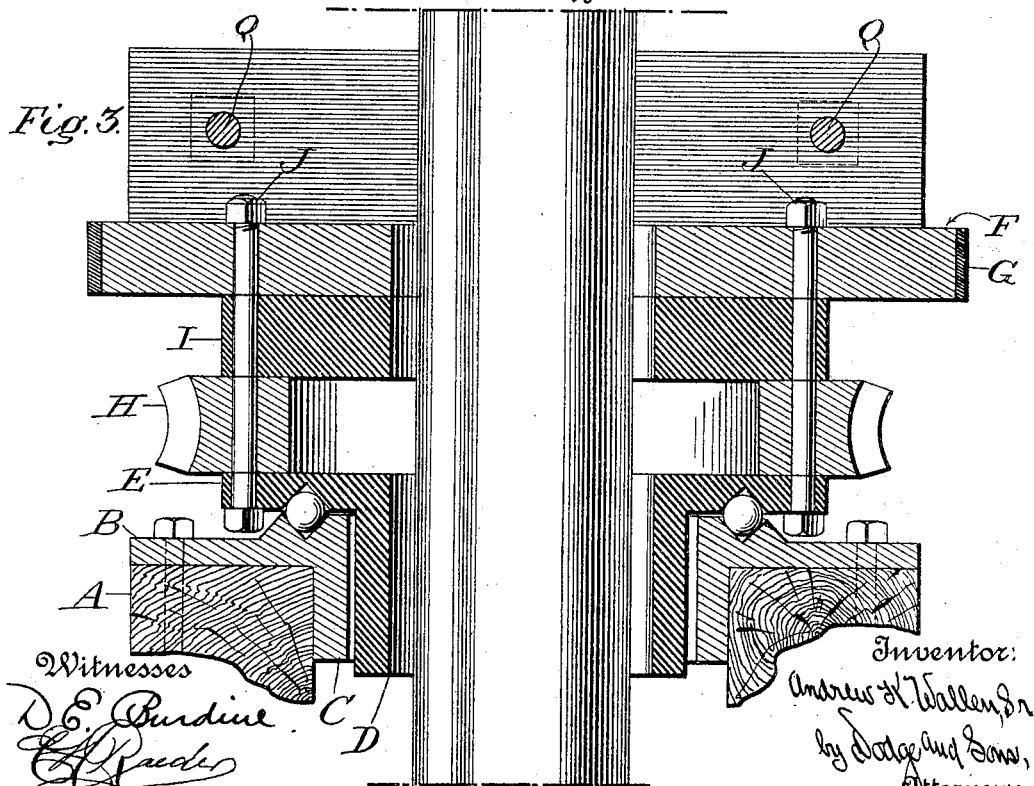

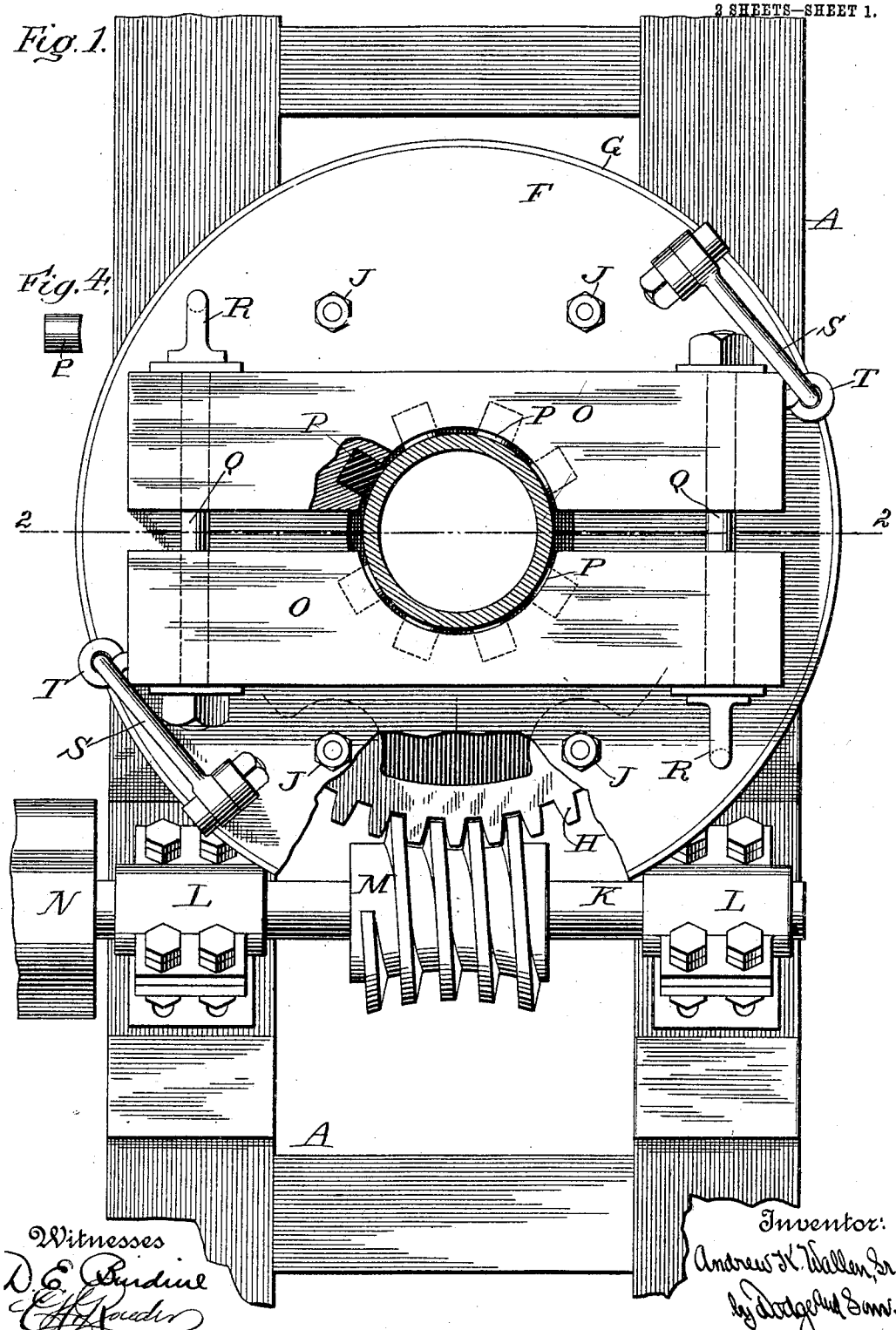

UNITED STATES PATENT OFFICE.

ANDREW K. WALLEN, SR., OF JACKSON, MISSISSIPPI.

WELL-BORING APPARATUS.

No. 810,097.     Specification of Letters Patent.     Patented Jan. 16, 1906.

Application filed May 5, 1903. Serial No. 155,758.

*To all whom it may concern:*

Be it known that I, ANDREW K. WALLEN, Sr., a citizen of the United States, residing at Jackson, in the county of Hinds and State of Mississippi, have invented certain new and useful Improvements in Well-Boring Apparatus, of which the following is a specification.

My present invention pertains to improvements in well-boring apparatus, the construction and advantages of which will be hereinafter set forth, reference being had to the annexed drawings, wherein—

Figure 1 is a top plan view of the apparatus, portions thereof being broken away to more clearly illustrate the construction; Fig. 2, a side elevation thereof; Fig. 3, a sectional view on the line 2 2 of Figs. 1 and 2, and Fig. 4 a detail view of one of the yielding clamping plugs or blocks.

The object of my invention is to provide a simple and efficient mechanism for boring wells, and more particularly for lowering the pipe or casing into the same.

Referring to the drawings, A denotes the framework, upon which is securely bolted the supporting member B, having a raceway or track in the upper face thereof. Said member B is also provided with a downwardly-extending skirt C, into which fits a collar D, formed as a part of a plate E. Said plate is provided with a ball-raceway complemental to that of the member B, balls being interposed between these two parts to permit rotation of the plate E and the parts attached thereto.

F denotes the clamp-supporting bed or table, provided with a rim or tire G to properly strengthen the same.

A worm-gear H and a riser block or member I are interposed between the plate E and the clamp-supporting table F, these members being all securely fastened together by bolts J, which pass therethrough, as shown most clearly in Fig. 3.

A shaft K is mounted in suitable boxes or bearings L, adjustably secured upon the framework A or blocks mounted thereon. A worm M is secured to said shaft and meshes with the gear H, as clearly indicated in Figs. 1 and 2. Motion is imparted to shaft K through a pulley N or in any other suitable manner. The construction shown is preferable, however, as said shaft may be driven by a belt, as shown in Fig. 2, this arrangement leaving the space about the apparatus practically unobstructed—a point of material advantage in machines of this character.

Mounted upon the member F is a clamp which comprises two heavy timbers or blocks O O, each formed with a semicircular recess in its face adjacent the corresponding member. The walls of these recesses are provided with a series of seats or sockets, into which are forced blocks or plugs P of any suitable yielding material—as, for instance, rubber. As will be seen upon reference to Fig. 1, the members O do not abut, although they may be forced one toward the other by bolts Q, which pass horizontally through them, each of said bolts being provided at one end with an enlarged eye R, into which a lever may be inserted for the purpose of turning the bolt and causing it to screw through its nut, and consequently draw the clamping members O together.

Hooks S are pivotally secured to the bed F, the free end of each hook passing into an eye T or the like, secured to the adjacent member O of the clamp.

With the construction above set forth it will be seen that as motion is imparted to the table or supporting-bed the clamp must of necessity move therewith.

A well-boring machine constructed in accordance with the foregoing description has been found to give eminent satisfaction, the use of worm-gear being advantageous over the ordinary bevel-gearing or friction drive and likewise more powerful in its action. The clamp also forms a safe device for use in lowering the pipe and auger when boring.

Having thus described my invention, what I claim is—

1. In a well-boring machine, the combination of a rotatable table; a clamp comprising two blocks or timbers O, O, each having a semicircular recess formed in the face adjacent to the corresponding member; yielding plugs mounted in the blocks in line with said recesses; bolts Q extending through said blocks, one end of each bolt being provided with an enlarged eye R; and means for securing said members O to the table.

2. In a well-boring machine, the combination of a rotatable table; a clamp comprising two blocks or timbers O, O, each having a semicircular recess formed in the face adjacent to the corresponding member; yielding plugs mounted in the blocks in line with said recesses; bolts Q extending through said blocks, one end of each bolt being provided with an enlarged eye R; hooks pivotally secured to the table; and means for securing connection between said hooks and the blocks or timbers.

In testimony whereof I have signed my name to this specification in the presence of two subscribing witnesses.

ANDREW K. WALLEN, Sr.

Witnesses:
 T. McCleland,
 Yuger Clifton.